No. 616,033. Patented Dec. 13, 1898.
H. E. STURCKE.
SCREENING APPARATUS.
(Application filed Jan. 28, 1898.)
(No Model.) 2 Sheets—Sheet 1.
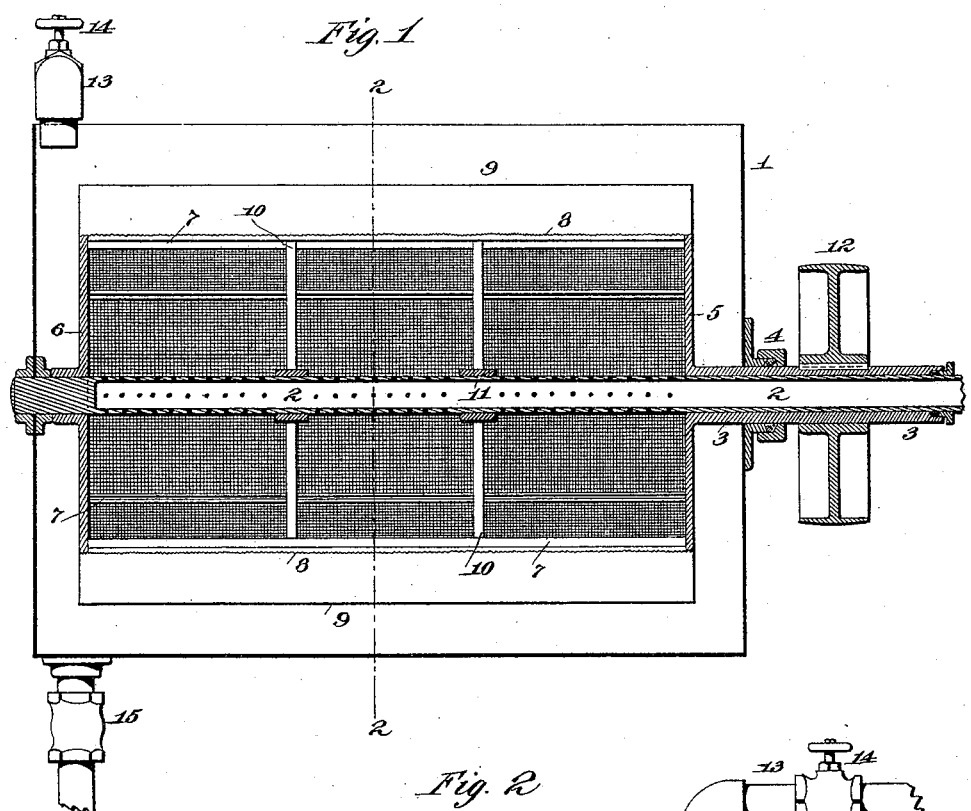
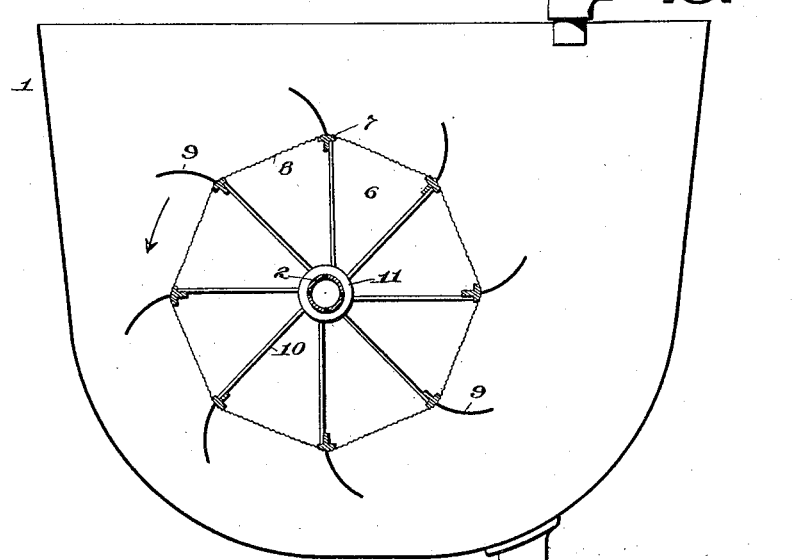
Witnesses:
Inventor
Herman E. Sturcke
by Rich'd N. Dyer
Att'y.

No. 616,033. Patented Dec. 13, 1898.
H. E. STURCKE.
SCREENING APPARATUS.
(Application filed Jan. 28, 1898.)
(No Model.) 2 Sheets—Sheet 2.
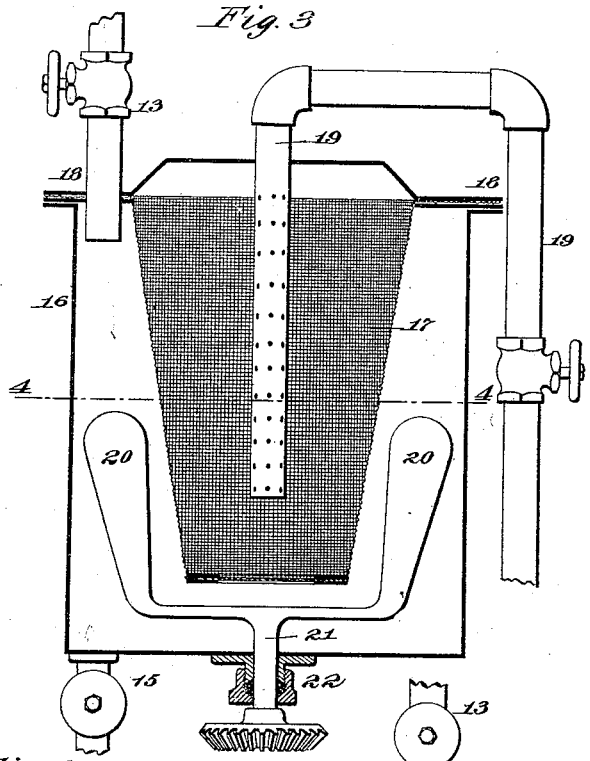
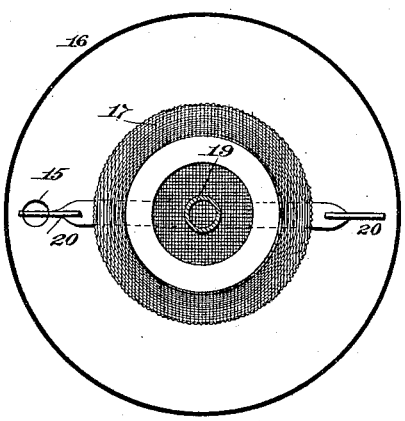
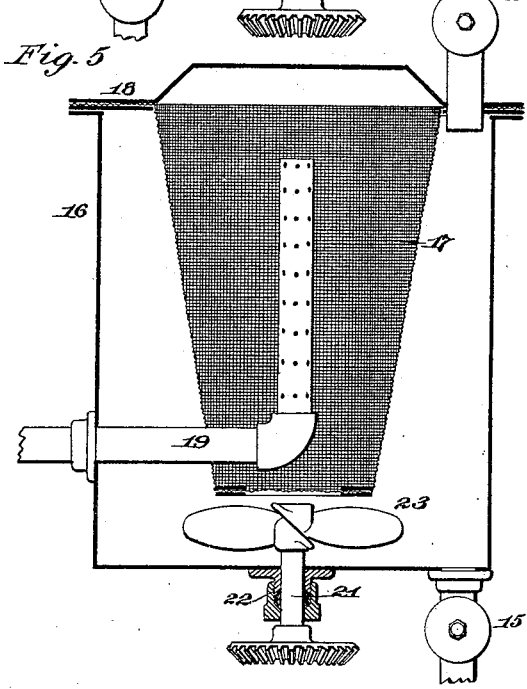
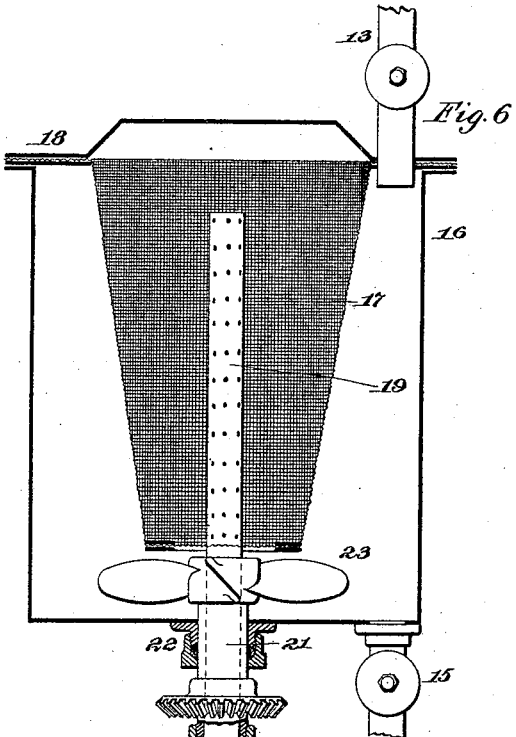
Witnesses: Inventor
Herman E. Sturcke
by Rich⁴ N. Dyer
Att'y.

UNITED STATES PATENT OFFICE.

HERMAN E. STURCKE, OF NEW YORK, N. Y., ASSIGNOR TO THE ALBA CHEMICAL COMPANY, OF SAME PLACE.

SCREENING APPARATUS.

SPECIFICATION forming part of Letters Patent No. 616,033, dated December 13, 1898.

Application filed January 28, 1898. Serial No. 668,262. (No model.)

*To all whom it may concern:*

Be it known that I, HERMAN E. STURCKE, a citizen of the United States, residing at New York, (Jamaica,) in the county of Queens and State of New York, have invented certain new and useful Improvements in Screening Apparatus, of which the following is a specification.

My invention relates to an improved type of screening or filtering apparatus adapted for screening or separating finer from coarser particles held in suspension or precipitation in a liquid.

The invention is especially adapted for use in the screening or filtration of extremely fine particles from coarser particles, being used in some instances with particles which pass through a screen of from one hundred to two hundred meshes to the linear inch, the screen being so arranged and constructed that even when of such extreme fineness no weight of the material will be carried thereon, so that the screen will not only be prevented from clogging, but cannot be distorted and the interstices enlarged by the weight of the material.

Broadly stated, my invention comprises a screening or filtering apparatus for separating finer from coarser particles held in suspension or precipitation in a liquid, such apparatus being so constructed that the weight of the material will not be imposed thereon, and combined with devices working adjacent to the screen and by which the liquid will be maintained in constant agitation.

In carrying out my invention I provide a suitable tank or receptacle, in which the liquid carrying the particles in suspension or precipitation is introduced either continuously or intermittently, in providing a substantially inclosed screen within said tank or receptacle, and in extending a suction-pipe within or adjacent to said screen, so that the screen will be interposed between the suction and the admission pipes, whereby when suction is applied to the former the liquid carrying the finer particles will pass through the screen and thence out of the apparatus, the coarser particles being rejected by the screen, as will be understood. Preferably mechanism is employed in connection with the screening apparatus for keeping the liquid in constant agitation, so as to prevent clogging of the screen. This may be accomplished either by rotating the screen, in which case the screen may be provided with suitable paddles thereon for facilitating the operation, or by utilizing suitable stirring-arms or other liquid-disturbing elements independently of the screen.

In order that my invention may be better understood, attention is directed to the accompanying drawings, forming a part of this specification, in which—

Figure 1 is a longitudinal sectional view of a screening or filtering apparatus embodying my present improvements in what I consider to be the preferable form; Fig. 2, a cross-section on the line 2 2 of Fig. 1; Fig. 3, a vertical section of a modified form of screening or filtering apparatus employing a stationary screen; Fig. 4, a section on the line 4 4 of Fig. 3, and Figs. 5 and 6 vertical sections of further modifications.

In all of the above views corresponding parts are represented by the same numerals of reference.

1 represents a suitable receptacle or tank having preferably a rounded bottom and vertical ends, the said tank being conveniently made of sheet-iron. Mounted within this tank is a stationary suction-pipe 2, which leads to a suitable suction-pump or which itself may constitute a siphon to produce the necessary suction.

3 is a sleeve mounted on the pipe 2 and passing through a suitable packing-box 4 in one wall of the tank 1. The said sleeve carries a disk 5 within the tank.

6 is a corresponding disk mounted on the suction-pipe 2 near the other wall of the tank. Connecting the disks 5 and 6 are suitable stay-rods or braces 7, which may be conveniently made of light T-irons, so that a sufficiently-strong framework will be obtained. Carried upon the braces 7 is the screen 8, of the proper mesh.

In order to provide for the desired agitation of the material, I prefer to make use of a plurality of paddles or wings 9, which may be bolted or otherwise secured to the braces 7.

In order to strengthen the device, suitable supports or spokes 10 may extend at desired points between the braces 7 and collars 11, turning upon the suction-pipe 2. Preferably the paddles or wings 9 are curved, as shown, and extend at an angle to the diameter of the screen, so as not only to more vigorously agitate the liquid, but also to effectively aerate the same, it being obvious that when the screen is rotated in the direction indicated by the arrow a small amount of air will be caught beneath each paddle or wing and carried down into the liquid. This feature of aeration is important with some liquids to which a supply of air is to be furnished. For instance, when the screening or filtering apparatus is employed in separating carbonate of lime from a milk of carbonate obtained by adding water to the precipitate obtained in the manufacture of caustic lime a small quantity of caustic will appear as an impurity in the precipitate. This caustic lime may be converted into carbonate by adding carbonic acid to the liquid. I find in practice that when a sufficient amount of air is introduced into the liquid during the screening operation the carbonic acid therein will be sufficient to convert the caustic lime present into carbonate, and therefore result in an increased capacity of the apparatus. In order to rotate the screen, I employ a driving-pulley 12, which is keyed to the sleeve 3 on the outside of the tank 1 and to which power may be applied. The liquid carrying the particles in solution or precipitation is introduced into the tank through a suitable pipe 13, having a valve 14 therein, and the heavier particles rejected by the screen may be removed from the tank by a valved draw-off pipe 15, arranged at the bottom of the tank or receptacle.

Instead of employing a rotating screen, as explained, a stationary screen may be used, as shown in Figs. 3 to 6, inclusive. In Fig. 3 I make use of a tank or receptacle 16 substantially cylindrical in form and depend therein a screen 17 in the shape of a truncated cone. This screen is secured within the receptacle or tank 16 by being flanged outwardly at its upper end and being clamped in place by an annular ring 18. In this form a suction-pipe 19 is introduced within the screen 17, its lower end being arranged, preferably, near the bottom of the screen. The liquid carrying the particles in suspension or precipitation is introduced into the tank 16 through a pipe 13, as in Fig. 1, and the coarser particles rejected by the screen may be removed through a corresponding valved draw-off pipe 15. In the form of device shown I provide for the agitation of the liquid by means of stirring-arms 20, working between the screen 17 and the interior of the tank 16 and carried on a shaft 21, to which power is applied. Said shaft passes through a packing-box 22 in the bottom of the screen and by which leakage will be prevented.

The form of device illustrated in Fig. 5 is similar to that shown in Figs. 3 and 4, except that instead of the stirring-arms 20 for agitating the material I employ an ordinary propeller 23 for the purpose, and instead of extending the suction-pipe 19 downwardly within the screen I connect the same to the lower end of the screen and pass the same through the walls of the receptacle or tank.

In Fig. 6 a form of device similar to that shown in Figs. 3 and 4 is illustrated, except that the suction-pipe passes from the bottom of the screen down through the shaft of the stirring-arms, as in some instances may be desirable.

In all the forms of the device shown the suction-pipe within the screen is preferably perforated with numerous small holes, so that a very powerful suction may be obtained.

By arranging a screening or filtering apparatus as shown, comprising in all instances a tank with a screen therein, said screen being interposed between the suction and entrance pipes, I obtain a screening apparatus especially adapted for use in the filtration of very fine particles held in suspension or precipitation in a liquid, for the reason that the weight of such particles is in every instance removed from the screen, so that the interstices thereof cannot be enlarged or distorted by such weight. Such construction also largely removes the possibility of the screen becoming clogged, which objection is entirely overcome by employing suitable means for keeping the liquid in constant agitation.

With the forms of device illustrated, and particularly with that form shown in Figs. 1 and 2, I provide during the operation for an effective aeration of the solution, which is of importance with materials to which a supply of air should be added.

Having now described my invention, what I claim as new, and desire to secure by Letters Patent, is as follows:

1. An improved screening or filtering apparatus comprising a receiving tank or receptacle, an admission-pipe for admitting a solution carrying the particles to be screened or filtered in solution or precipitation, a suction-pipe, a screen interposed between said suction-pipe and the admission-pipe, and means adjacent to the screen for keeping the liquid in agitation, substantially as set forth.

2. An improved screening or filtering apparatus comprising a receiving tank or receptacle, an admission-pipe for admitting a solution carrying the particles to be screened or filtered in solution or precipitation, a suction-pipe, a screen interposed between said suction-pipe and the admission-pipe, and stirring arms or wings working adjacent to the screen for keeping the liquid in agitation, substantially as set forth.

3. An improved screening or filtering apparatus comprising a receiving tank or receptacle, an admission-pipe for admitting a solution carrying the particles to be screened or filtered in solution or precipitation, a suction-pipe, a screen interposed between said suction-pipe and the admission-pipe, stirring arms or wings working adjacent to the screen for keeping the liquid in agitation, and a draw-off pipe for removing the coarser particles rejected by the screen, substantially as set forth.

4. An improved screening or filtering apparatus comprising a receiving tank or receptacle, an admission-pipe for admitting a solution carrying the particles to be screened or filtered in solution or precipitation, a suction-pipe, a screen interposed between said suction-pipe and the admission-pipe, and means for aerating the liquid, substantially as set forth.

5. An improved screening or filtering apparatus comprising a receiving tank or receptacle, an admission-pipe for admitting a solution carrying the particles to be screened or filtered in solution or precipitation, a suction-pipe, a screen interposed between said suction-pipe and the admission-pipe, and means for aerating and simultaneously agitating the liquid, substantially as set forth.

6. An improved screening or filtering apparatus comprising a tank or receptacle, a rotating screen in said receptacle, a suction-pipe opening within said screen, an admission-pipe outside of said screen for admitting into the receptacle a liquid carrying in suspension or precipitation the particles to be screened or filtered, and paddles or wings carried by said screen, substantially as set forth.

7. An improved screening or filtering apparatus comprising a tank or receptacle, a rotating screen in said receptacle, a suction-pipe opening within said screen, an admission-pipe outside of said screen for admitting into the receptacle a liquid carrying in suspension or precipitation the particles to be screened or filtered, and curved paddles or wings carried by said screen, substantially as set forth.

This specification signed and witnessed this 10th day of January, 1898.

HERMAN E. STURCKE.

Witnesses:
EUGENE CONRAN,
JNO. R. TAYLOR.